April 29, 1941.   S. D. BERT   2,240,324
GLASS FORMING MACHINE
Filed April 21, 1939   5 Sheets-Sheet 2

INVENTOR.
Samuel D. Bert,
BY Archworth Martin,
ATTORNEY.

April 29, 1941.   S. D. BERT   2,240,324
GLASS FORMING MACHINE
Filed April 21, 1939     5 Sheets-Sheet 4

INVENTOR.
Samuel D. Bert,
BY
Archworth Martin,
ATTORNEY.

Patented Apr. 29, 1941

2,240,324

UNITED STATES PATENT OFFICE 2,240,324

GLASS FORMING MACHINE

Samuel D. Bert, Washington, Pa., assignor of one-third to Maurice A. Yorkin and one-third to James D. Martin, both of Washington, Pa.

Application April 21, 1939, Serial No. 269,134

4 Claims. (Cl. 74—436)

My invention relates to glass-forming machines, and more particularly to that type wherein intermittent rotative movements are imparted to a table which carries the molds, and wherein the charges of glass are subjected to pressing or blowing operations, or to both pressing and blowing.

Glass-forming machines of the intermittently moving type are commonly driven by a driving member that rotates at a constant number of revolutions per minute, so that the periods of pause or dwell are sometimes longer than necessary, with consequent danger of forming imperfect ware and always with a slower production rate than is required. Also, in some instances where the periods of dwell are of proper duration, the table is moved too slowly when bringing successive molds into working position beneath a press head or blow head, with resultant slower production of ware.

My invention has for one of its objects the provision of means whereby the driving mechanism for a mold table can be operated at a maximum speed, with proper periods of "dwell" for the performing of glass-shaping operations.

Another object of my invention is to provide means whereby a constantly rotatable table-driving member will automatically be rotated more rapidly when moving the table from one dwell point to the next, than during the periods of dwell.

Still another object of my invention is to provide driving mechanism for an intermittently movable table which can readily be varied to properly proportion the duration of dwell relative to the periods of movement, and whereby changes as between the dwell periods and the moving periods can be readily effected.

Figure 1:
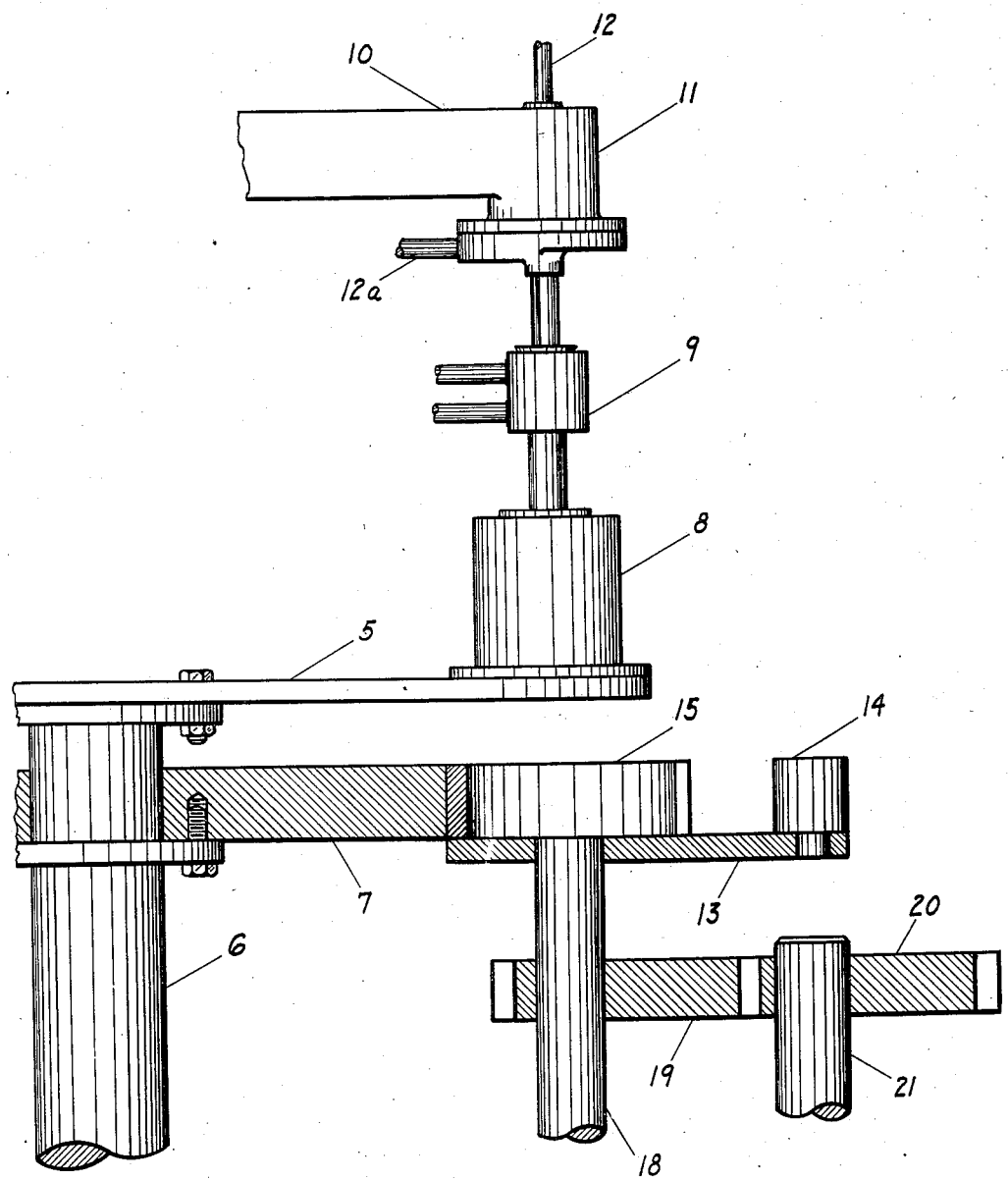
Figure 2:
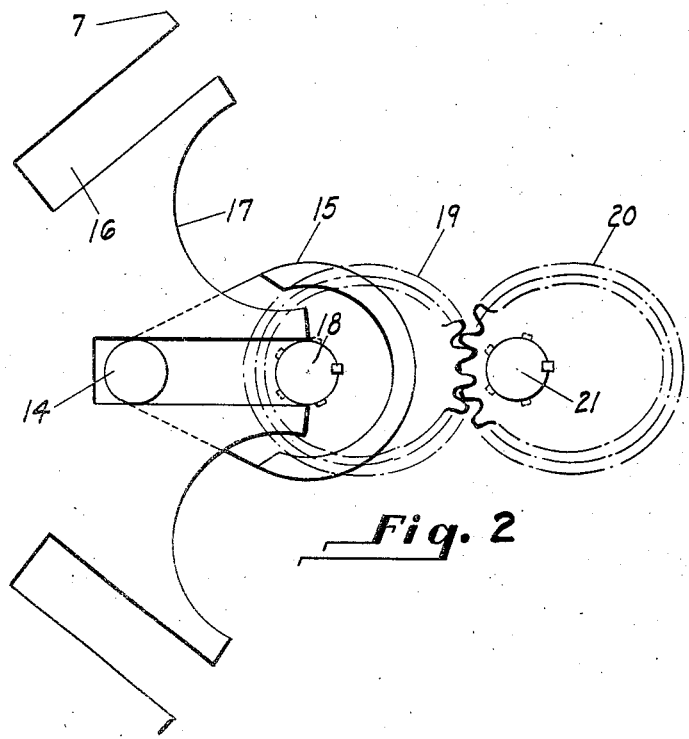
Figure 3:
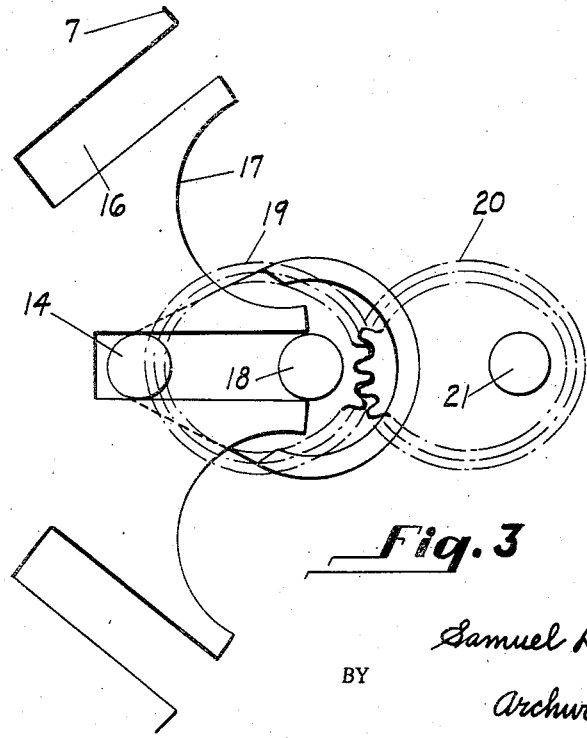
Figure 4:
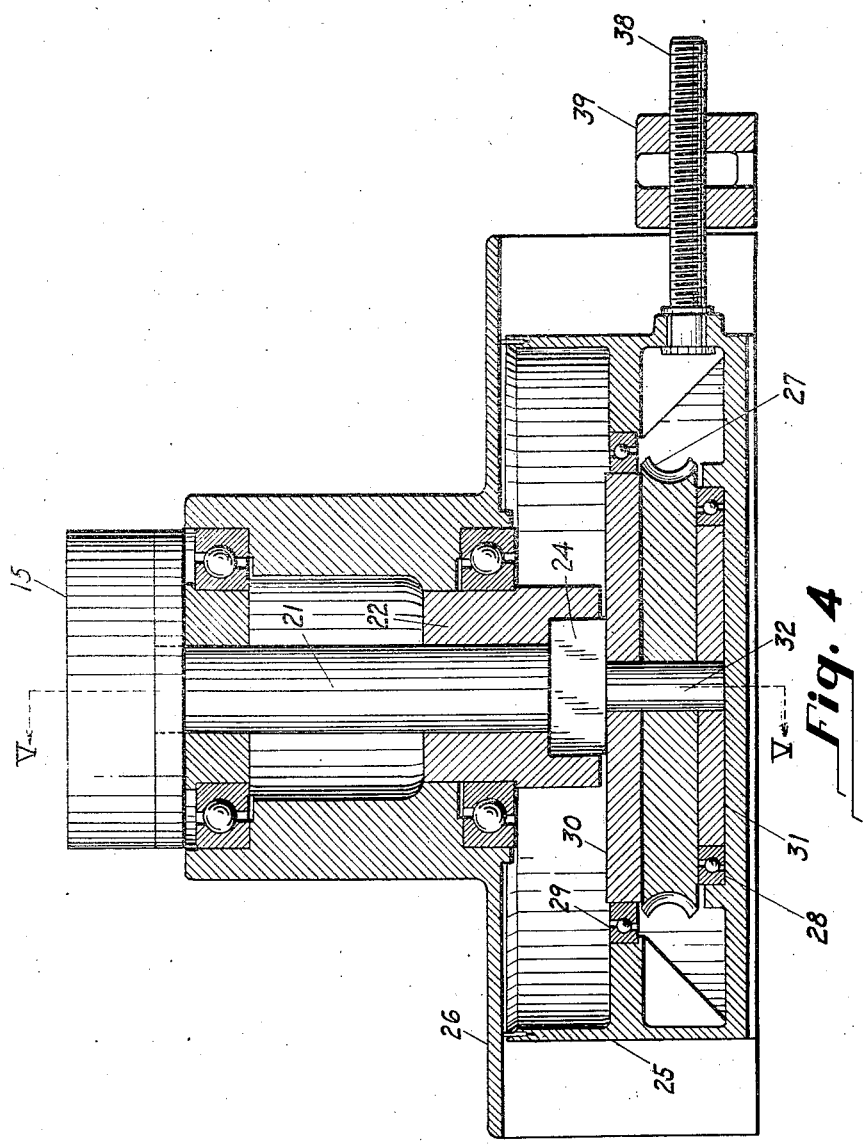
Figure 5:
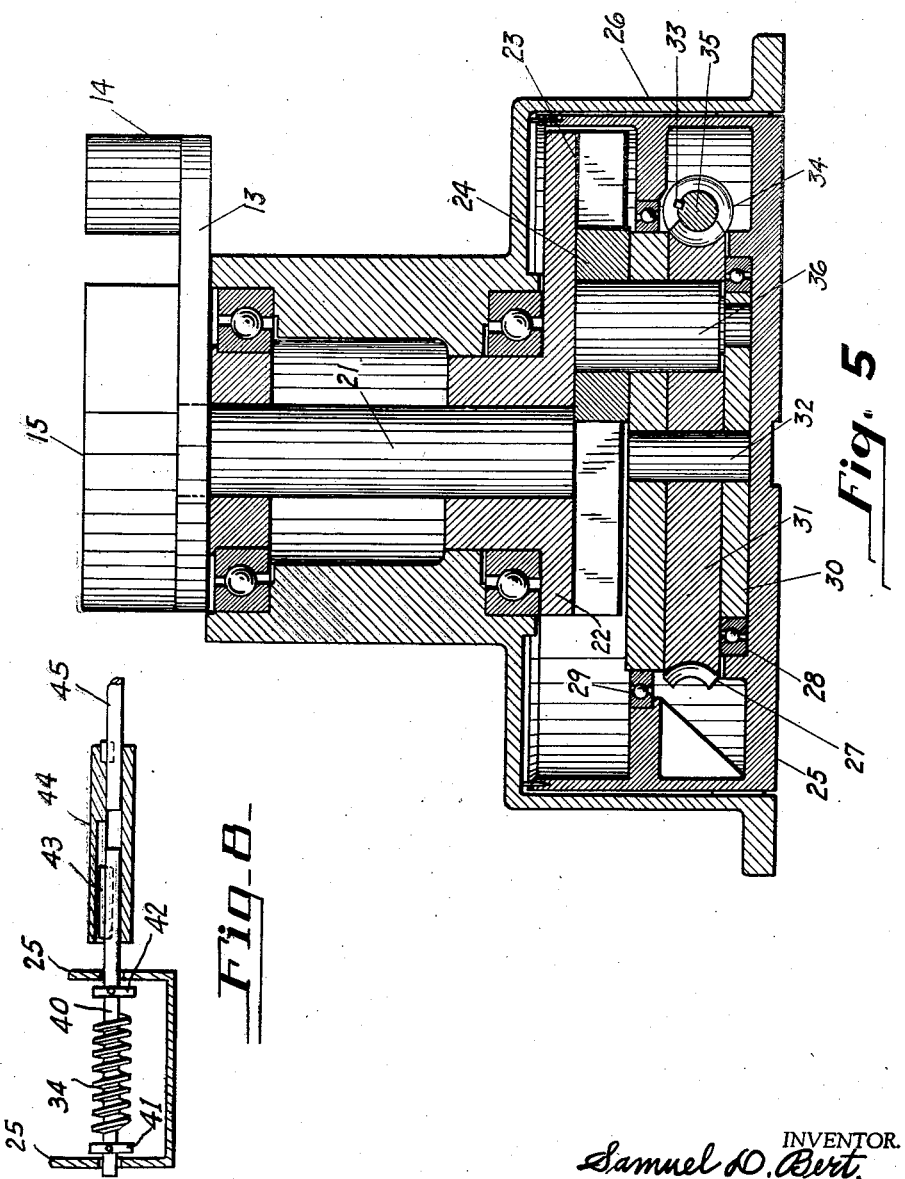
Figure 6:
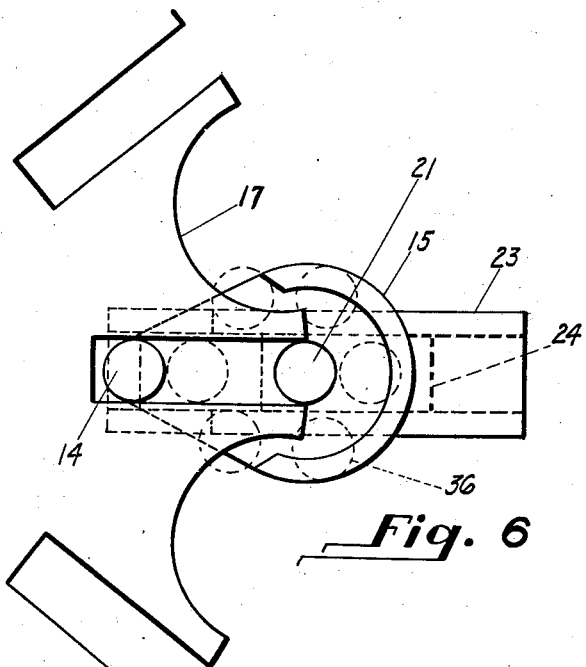
Figure 7:
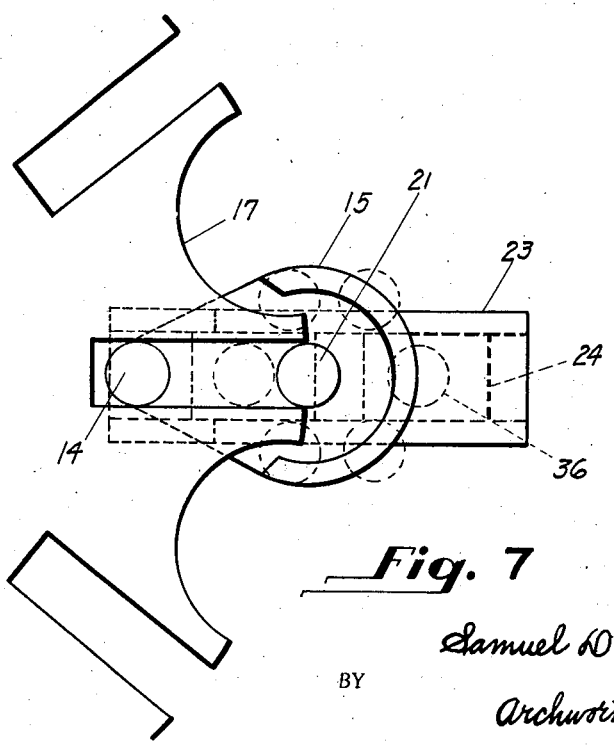

Some of the forms which my invention may take are shown in the accompanying drawings wherein Figure 1 is a vertical sectional view showing a portion of a mold table and the driving mechanism therefor; Fig. 2 is a schematic plan view of the structure of Fig. 1; Fig. 3 is a schematic plan view showing a different arrangement of the driving parts than that shown in Figs. 1 and 2; Fig. 4 is a vertical sectional view of a modified form of driving mechanism for the mold table; Fig. 5 is a view taken on the line V—V of Fig. 4; Fig. 6 is a diagrammatic plan view showing certain of the parts of Figs. 4 and 5 in one position of adjustment; Fig. 7 is a similar view showing such parts in another position of adjustment, and Fig. 8 shows a modification of a portion of the driving mechanism of Fig. 5.

Referring first to Figs. 1 to 3, I show driving mechanism applied to a mold table 5 that is carried by a rotatable column 6 which also carries a Geneva gear wheel 7. The mold table carries the usual series of molds 8 that are distributed about the periphery thereof and which are successively brought into position beneath a forming member 9, which may be a press head, a blow head, or a parison-forming device. The forming head 9 is supported from an arm 10 that also carries a cylinder 11 having inlet and outlet ports 12 and 12a, for operating a piston within the cylinder to raise and lower the forming head 9, in a manner common in the art. It will be understood that the table 5 is rotated intermittently to bring successive molds 8 beneath the forming head 9.

The Geneva gear wheel 7 is driven by a Geneva pinion 13 which has the usual tooth 14, which periodically enters radial slots 16 in the edge of the gear wheel 7, to move the table 5 step-by-step. The curved boss 15 on the Geneva pinion enters curved recesses 17 in the edge of the gear wheel 7, to maintain the gear and table 5 stationary after the tooth 14 has passed out of each radial slot in the gear wheel, and until the said tooth enters another radial slot 16, to move the table another step. These parts are all conventional and well known.

The present invention is concerned with rotating the table at variable speeds, so that although the pinion is being rotated a given number of revolutions per minute, the table can be moved more rapidly or more slowly, between the "dwell" periods, as may be desired, the durations of "dwell" being correspondingly lengthened or shortened.

The pinion 13 is mounted on a shaft 18 that carries an elliptic gear 19 which meshes with an elliptic gear wheel 20 that is secured to a shaft 21 which is driven by a motor or other suitable source of power.

As shown in Figs. 1 and 2, the gear wheel 20 has the teeth on its small radius portion meshing with the teeth on the larger radius of the gear wheel 19, the pinion tooth 14 being located in one of the gear slots 16, so that the gear wheel 7, and consequently the table, will be rotated slowly. When the curved boss 15 of the Geneva pinion enters a recess 17 in the Geneva gear, the large radius portion of the gear wheel 20 will have come into engagement with the small radius portion of the gear wheel 19, so that there will be faster rotative movement of the Geneva gear pinion 13 at that stage, and consequently a shorter dwell period of the table than if ordinary gears of uniform radius were employed, instead of the gear wheels 19 and 20. During these dwell periods, shaping operations will be performed upon the mold table, as by pressing glassware in a mold, forming a parison, or blowing operations.

When short periods of dwell are desired relative to the time required for moving the table one step, the gear wheels 19 and 20 will be arranged as shown in Figs. 1 and 2, while if longer periods of dwell are required, the gear wheels 19 and 20 will be arranged on their respective shafts in the manner shown in Fig. 3. Thus, in the forming of heavy ware by a pressing operation or in the blowing of larger sizes of ware, a longer dwell period will be required than in the pressing of small ware or in the forming of parisons. It will be understood that the gear wheels 19 and 20 will be removable from their shafts so that shift can be made from the arrangement shown in Fig. 2 to that shown in Fig. 3, or a shift made to other gear wheels of different elliptic contour. Also, adjustment of timing can be effected by simply rotatably adjusting the gear wheels 19 and 20 on their shafts, a suitable number of keyways being provided for this purpose.

In Fig. 3, the positions or angularity of the elliptic gears 12 and 20 relative to the Geneva pinion 13 are reversed as compared to the showing in Figs. 1 and 2, in that when the tooth 14 is in a slot of the Geneva gear wheel, the wide radius portion of the gear wheel 20 is in driving engagement with the small-radius portion of the gear wheel 19, so that there is rapid movement of the Geneva gear and the mold table when being shifted from one dwell portion to another, and when the small-radius portion of the gear wheel 20 has encountered the larger radial portion of the gear wheel 19, there will be relatively slow movement of the pinion 13, while its dwell portion 15 is in a gear wheel slot 17. The mold table is, therefore, moved quite rapidly from one dwell point to the next, and there is a longer period during which the table is stationary than when the gear wheels 19 and 20 are arranged as shown in Fig. 2.

In Figs. 4, 5, 6 and 7 a somewhat different variable speed arrangement is shown for driving the Geneva pinion 13. In this structure the shaft 21 that carries the pinion has secured to its lower end a hub portion 22, which has an extension 23 that serves as a slideway for a slide block 24, the extension 23 serving as a crank by which the shaft 21 is rotated. The block 24 is adjustable longitudinally in the slot of the crank 23.

A shiftable gear housing 25 is supported within the base 26 of the machine and a worm wheel 27 is rotatably supported in the housing or gear case 25, by bearings 28 and 29, that engage lower face plates 30 and 31 that are rotatable unitarily with the worm wheel and a stud 32 which defines the axis of the worm wheel. The members 27, 30, 31 and 32 will rotate as a unit when the worm wheel 27 is driven by a worm 34. The worm 34 is slidably keyed upon a shaft 35, as indicated at 33, or the shaft itself may be formed of axially-extensible sections (Fig. 8), whereby the worm can be shifted longitudinally of the shaft without interruption of its driving connection with the worm wheel. The shaft 35 is journalled in the gear box 25 and is driven by a motor or other source of power. A stud 36 is carried by the members 27, 30 and 31 and extends upwardly into the slide block 24, so that when the worm wheel is rotated, the stud and the block 24 will serve as a driving connection for rotating the shaft 21 and its pinion 13.

The pinion will, of course, have the same number of revolutions as the worm wheel 31, but by shifting the axis 32 of the worm wheel relative to the axis of the shaft 21, the pinion will, during portions of rotative movement through its 180° cycle, be rotated faster than at other portions thereof, the variations in speed during one rotation depending upon the extent to which the axis of the worm wheel 27 is offset relative to the axis of the shaft 21, and hence to the radial position of the block 24 in the crank 23 of the shaft 21.

Adjustments of the worm wheel and its housing 25 relative to the shaft 21, are effected by an adjusting screw 38, that has threaded engagement with a fixed support 39, and swivel connection wtih the bearing housing 30, so that when the screw 38 is turned, the bearing housing and the worm wheel carried thereby will be shifted radially of the shaft 21.

As shown in Fig. 8, the worm 34 is secured to a shaft 40 that is journalled in bearings in opposite sides of the gear case 25, being held against endwise shifting therein by thrust collars or bearings 41 and 42. A key 43 is firmly set in the shaft 40 and is slidable longitudinally in a keyway provided in a sleeve 44, when the screw 38 is turned to adjust the gear housing 25. The sleeve 44 is firmly keyed to a shaft 45 that is driven by a motor or other source of power.

If it is desired that the pinion 13 be rotated at a constant rate of speed, the gear case 25 will be centrally positioned with the axis 32 of the worm wheel in alignment with the axis of the shaft 21, so that, as indicated in Fig. 6, the periods of dwell will be approximately equal to the time required for one step of table movement. If, on the other hand, the worm wheel is shifted so as to move the driving stud 36 and the slide block 24 to the positions shown in Fig. 7, there will be relatively rapid travel of the table during each step of movement, with relatively longer periods of dwell.

It will be seen that the worm gear can be driven at the highest rate of speed consistent with proper dwell at the forming stations, and that as the step movements are quite rapid, there will be considerable saving in time over what would be required to complete a revolution of the table if the Geneva pinion were rotated at a uniform rate of speed which would be limited by the time required to perform a forming operation during the dwell period. This saving of time can, of course, also be effected by the use of elliptical gears, as shown in Fig. 3.

Another advantage of my invention resides in the fact that the variable drive mechanism can readily be applied to existing glass-forming machines, whether such machines be intermittently driven by Geneva gearing, or intermittently driven in some other manner, as in the case of the machine of Simpson U. S. Patent 933,590, for example, which shows a table-driving pawl and ratchet transmission operated by a constantly rotating member.

I claim as my invention:

1. The combination with a driving device of the Geneva type, of a shaft for imparting rotative movements to said device, a bearing for supporting said shaft in vertical position, a crank-like extension carried by said shaft at its lower end, a bearing housing adjacent to the lower end of said shaft, vertically-spaced bearings in said housing, a rotatable member positioned in said bearings, a driving connection between said rotatable member and the said extension, and shiftable radially of one of these elements, means for adjusting the said housing and vertically-spaced bearings in radial directions relative to the shaft, and means engageable with the rotatable member at a point between the said bearings, for driving the member.

2. The combination with a driving device of the Geneva type, of a shaft for imparting rotative movements to said device, a bearing for supporting said shaft in vertical position, a crank-like extension carried by said shaft at its lower end, a rotatable member disposed beneath the lower end of said shaft, a driving connection between said rotatable member and the said extension, and shiftable radially of one of these elements, a shaft member for the rotatable member and projecting below the lower side thereof, a bearing for said shaft member, means for adjusting the rotatable member and its bearing in radial directions relative to the first-named shaft, and driving means for the rotatable member, engageable therewith in a plane above the last-named bearing.

3. The combination with a driving device of the Geneva type, provided with a shaft which carries the Geneva pinion, of a crank-like extension carried by said shaft adjacent to one end thereof, a rotatable member adjacent to said end of the shaft, a housing wherein said member is journalled, a driving connection between said rotatable member and the said extension, and shiftable radially of one of these elements, a rotatable driving element for said member, whose axis extends transversely of the axis of said rotatable member, and means for adjusting the said housing and the said rotatable member in radial directions relative to the said shaft, and for simultaneously shifting said driving connection.

4. The combination with a driving device of the Geneva type, provided with a shaft which carries the Geneva pinion, of a crank-like extension on the shaft, a worm wheel adjacent to said end of the shaft, on an axis parallel with said shaft, a driving connection between the worm wheel and said extension and shiftable radially of one of these elements, a worm meshing with said worm wheel, a shaft for driving the worm, and means for adjustably positioning the worm wheel in directions radially of the said shaft, and for shifting the said driving connection in a radial direction.

SAMUEL D. BERT.